United States Patent
Kim

(10) Patent No.: US 11,825,445 B2
(45) Date of Patent: Nov. 21, 2023

(54) METHOD AND APPARATUS FOR GROUP PAGING IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/053,592

(22) Filed: Nov. 8, 2022

(65) Prior Publication Data

US 2023/0093248 A1 Mar. 23, 2023

Related U.S. Application Data

(63) Continuation of application No. PCT/KR2022/007152, filed on May 19, 2022.

(30) Foreign Application Priority Data

May 28, 2021 (KR) .................. 10-2021-0069291

(51) Int. Cl.
*H04W 68/02* (2009.01)
*H04W 72/12* (2023.01)
*H04W 76/27* (2018.01)
*H04W 76/40* (2018.01)
*H04W 52/02* (2009.01)
*H04W 68/00* (2009.01)
(Continued)

(52) U.S. Cl.
CPC .......... *H04W 68/02* (2013.01); *H04W 72/121* (2013.01); *H04W 76/27* (2018.02)

(58) Field of Classification Search
CPC ... H04W 68/02; H04W 72/121; H04W 76/27; H04W 76/40; H04W 52/0219; H04W 52/0229; H04W 52/028; H04W 68/005; H04W 52/0216; H04W 4/08; Y02D 30/70
USPC ........................................... 455/458
See application file for complete search history.

(56) References Cited

U.S. PATENT DOCUMENTS

2006/0104225 A1* 5/2006 Kim .............. H04L 12/189
  370/313
2008/0233974 A1* 9/2008 Xu ............... H04W 76/40
  455/458
(Continued)

FOREIGN PATENT DOCUMENTS

CN 112544114 A * 3/2021 ........ H04W 72/1289

OTHER PUBLICATIONS

GPP TSG-RAN WG2 Meeting #114 electranic R2-2706349 Online, May 19-27, 2021 (Year: 2021).*
(Continued)

*Primary Examiner* — Inder P Mehra
(74) *Attorney, Agent, or Firm* — LEE HONG DEGERMAN KANG WAIMEY

(57) ABSTRACT

A method and apparatus for group paging in a wireless communication system is provided. A wireless device acquires a specific paging subgroup identifier (ID) related to the wireless device. A wireless device joins a multicast session. A wireless device receives, from a network, a paging early indication (PEI) which does not include the specific paging subgroup ID. A wireless device monitors a paging occasion associated with the PEI, to receive an activation notification for the multicast session.

14 Claims, 14 Drawing Sheets

(51) Int. Cl.
H04W 4/08 (2009.01)
H04W 72/121 (2023.01)

(56) References Cited

U.S. PATENT DOCUMENTS

2021/0014152 A1* 1/2021 Li .......................... H04L 12/185
2022/0131645 A1* 4/2022 Miao ........................ H04L 1/08

OTHER PUBLICATIONS

3GPP TSG RAN WG1 #105-e R1-2104532 e.Meating. May 74% . a7th 2004 (Year: 2021).*
PCT International Application No. PCT/KR2022/007152, International Search Report dated Aug. 19, 2022, 3 pages.
LG Electronics Inc., "UE subgrouping for paging enhancement," R2-2106349, 3GPP TSG-RAN WG2 Meeting #114 electronic, Online, May 2021, 5 pages.
Catt, "Paging enhancement for UE power saving," R1-2104532, 3GPP TSG RAN WG1 #105-e, e-Meeting, May 2021, 34 pages.
Mediatek Inc., "On Paging Enhancements for Idle/Inactive Mode UE Power Saving," R1-2105386, 3GPP TSG RAN WG1 #105-e, e-Meeting, May 2021, 22 pages.
Nordic Semiconductor ASA, "On paging early indication," R1-2105886, 3GPP TSG RAN WG1 #105, e-Meeting, May 2021, 20 pages.
3rd Generation Partnership Project, "Technical Specification Group Radio Access Network; NR; Radio Resource Control (RRC) protocol specification (Release 16)," Section 5.3.2 of 3GPP TS 38.331 V16.1.0, Jul. 2020, 906 pages.
3rd Generation Partnership Project, "Technical Specification Group Radio Access Network; NR; User Equipment (UE) procedures in Idle mode and RRC Inactive state (Release 16)," Section 7 of 3GPP TS 38.304 V16.1.0, Jul. 2020, 39 pages.
Korean Intellectual Property Office Application No. 10-2022-7042381, Office Action dated Sep. 18, 2023, 5 pages.
Ericsson et al., "KI#1: Conclusion update: Clarification of MBS Session Start/Activation, Stop/Deactivation", S2-2101413, SA WG2 Meeting #143E, Mar. 2021, 8 pages.
Oppo, "Further discussion on Paging enhancements for power saving", R1-2104787, 3GPP TSG RAN WG1 #105-e, May 2021, 6 pages.
LG Electronics, "Discussion on potential paging enhancements", R1-2100903, 3GPP TSG RAN WG1 #104-e, Feb. 2021, 5 pages.

* cited by examiner

METHOD AND APPARATUS FOR GROUP PAGING IN A WIRELESS COMMUNICATION SYSTEM

CROSS-REFERENCE TO RELATED APPLICATIONS

This application is a continuation of International Application No. PCT/KR2022/007152, filed on May 19, 2022, which claims the benefit of earlier filing date and right of priority to Korean Application No. 10-2021-0069291, filed on May 28, 2021, the contents of which are all hereby incorporated by reference herein in their entireties.

TECHNICAL FIELD

The present disclosure relates to a method and apparatus for group paging in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

To page UEs in RRC_IDLE/INACTIVE that are interested to receive a multicast service, group paging (that is, a paging message including a multicast service identifier) can be used. If the multicast service identifier of the interested multicast service is included in the received paging message, UE initiates RRC connection establishment procedure, to receive the multicast service of interest in RRC_CONNECTED.

On the other hand, in NR, a paging early indicator (PEI) including a subgroup ID is supported. If a UE has a specific subgroup ID, when the UE receives the PEI including the specific subgroup ID, the UE may monitor a paging occasion related to the PEI. If a UE has a specific subgroup ID, when the UE receives the PEI, not including the specific subgroup ID, the UE may not monitor a paging occasion related to the PEI.

Meanwhile, if UE in RRC_IDLE/INACTIVE wants to receive a multicast service, the UE should receive and read the paging message in every paging occasion since the UE doesn't know when the group paging is transmitted. This means that if UE wants to receive the multicast service, the UE should monitor the paging message more frequently, and spend more power for paging monitoring.

Therefore, studies for group paging in a wireless communication system are required.

In an aspect, a method performed by a wireless device in a wireless communication system is provided. A wireless device acquires a specific paging subgroup identifier (ID) related to the wireless device. A wireless device joins a multicast session. A wireless device receives, from a network, a paging early indication (PEI) which does not include the specific paging subgroup ID. A wireless device monitors a paging occasion associated with the PEI, to receive an activation notification for the multicast session.

In an aspect, a method performed by a wireless device in a wireless communication system is provided. A wireless device receives, from a network, a paging early indication (PEI) including an indicator informing whether a multicast session activation notification is transmitted in a paging occasion associated with the PEI. A wireless device determines whether to monitor the paging occasion associated with the PEI, based on the indicator.

In another aspect, an apparatus for implementing the above method is provided.

The present disclosure can have various advantageous effects.

According to some embodiments of the present disclosure, a wireless device could efficiently receive the group paging.

For example, a wireless device could avoid missing the group notification for a multicast session activation, while it is interested in the multicast session, by monitoring the associated paging occasion.

For example, a wireless device could avoid missing the group notification for a multicast session activation by monitoring the associated paging occasion, even though the PEI does not indicate the subgroup the UE belongs to.

According to some embodiments of the present disclosure, when a wireless device wants to receive the group paging, the wireless device can save the power.

For example, when a wireless device wants to receive the group paging, the wireless device can save the power, by skipping the monitoring the paging occasion when the paging early indicator indicates that the group paging is not transmitted in the following paging occasion.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
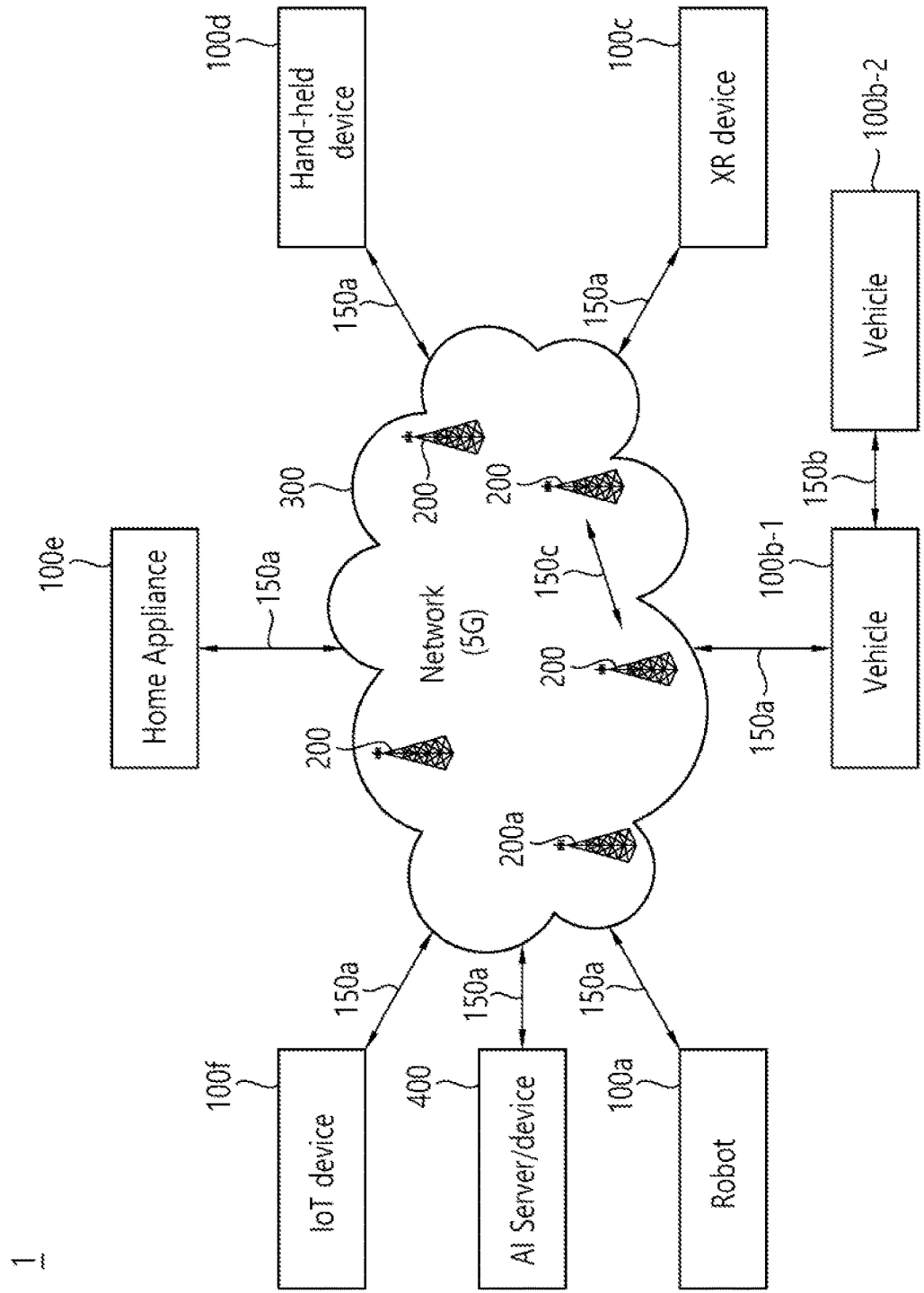
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband Internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
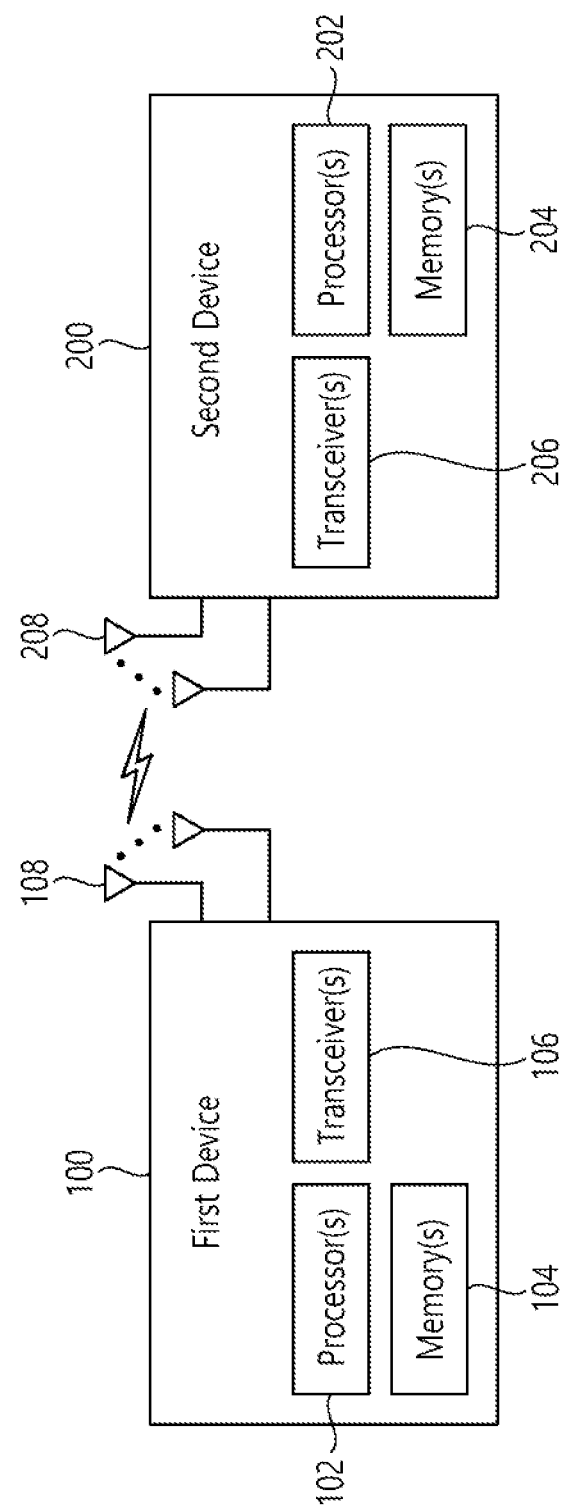
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to '} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
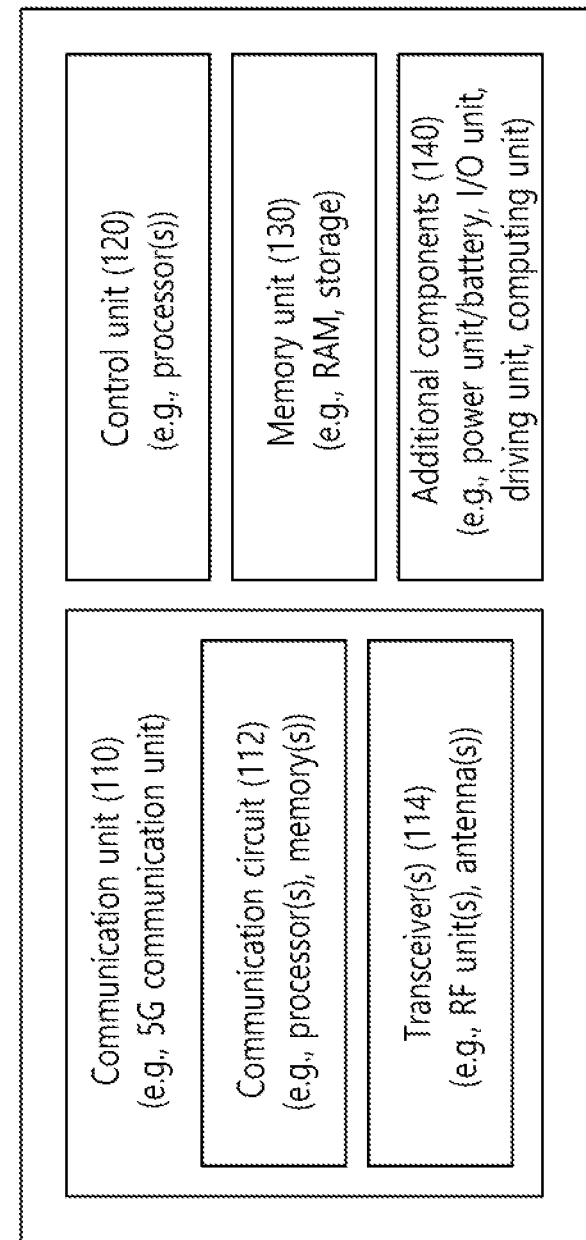
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
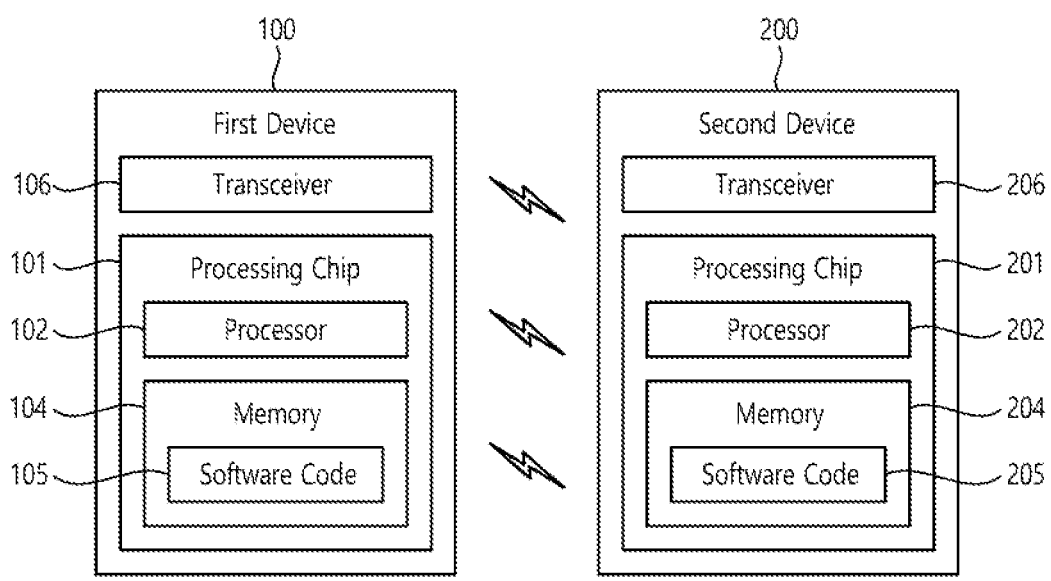
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
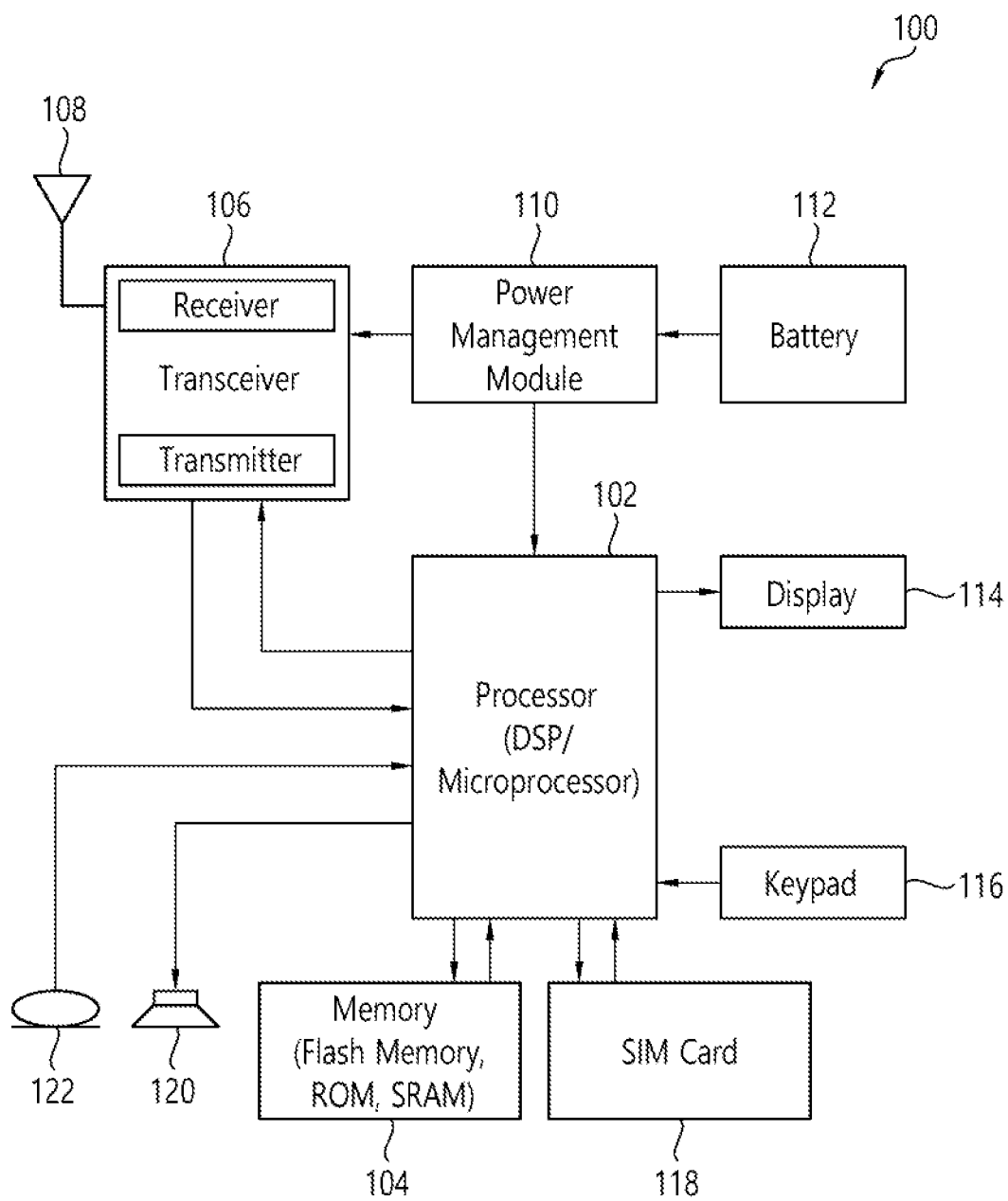
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
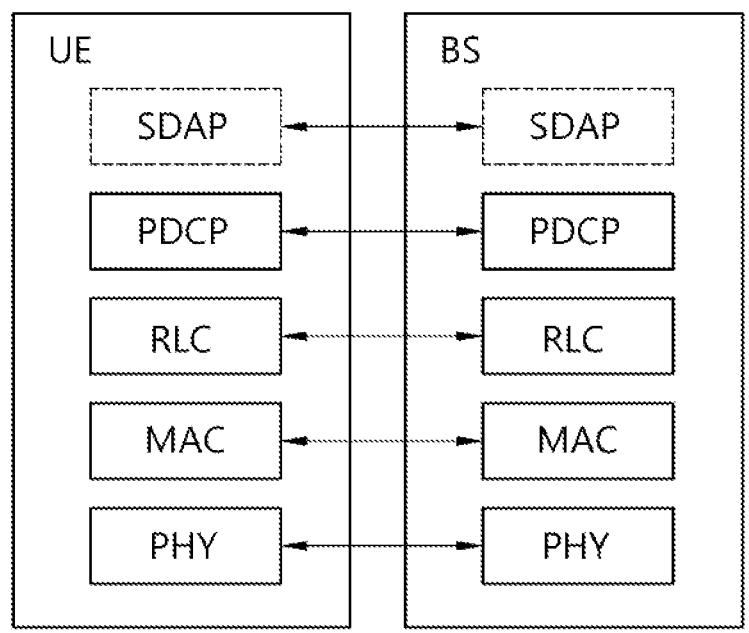
FIGS. 6 and 7 show an example of protocol stacks in a 3GPP based wireless communication system to which implementations of the present disclosure is applied.
Figure 7:
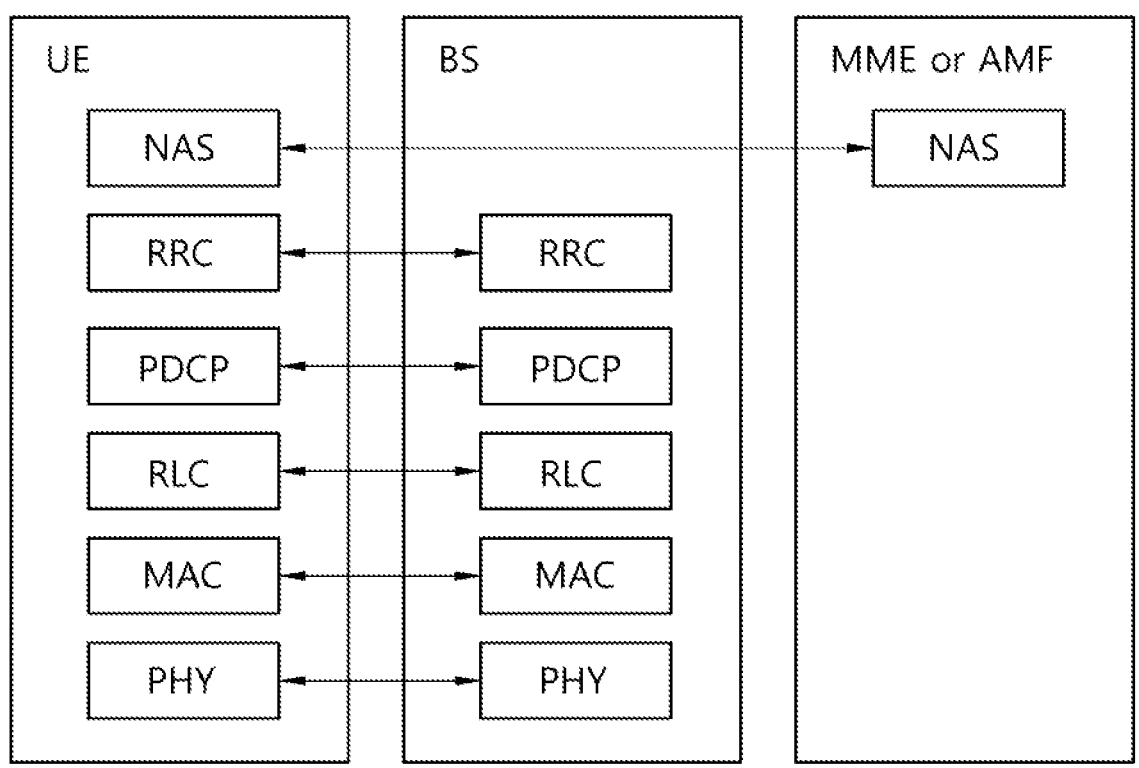

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
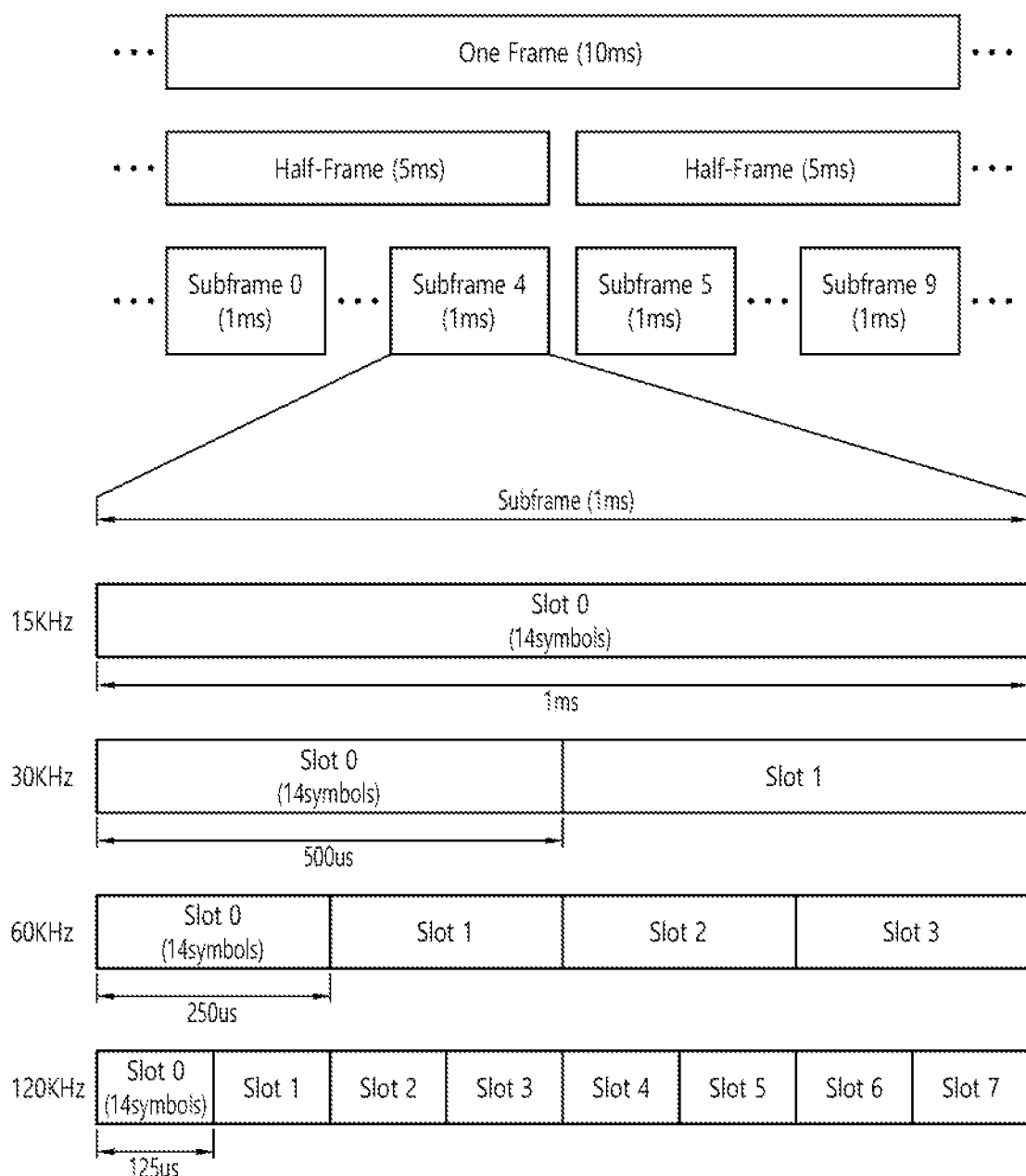
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing of $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |

TABLE 1-continued

| u | $N^{slot}_{symb}$ | $N^{frame,u}_{slot}$ | $N^{subframe,u}_{slot}$ |
|---|---|---|---|
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure.

Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
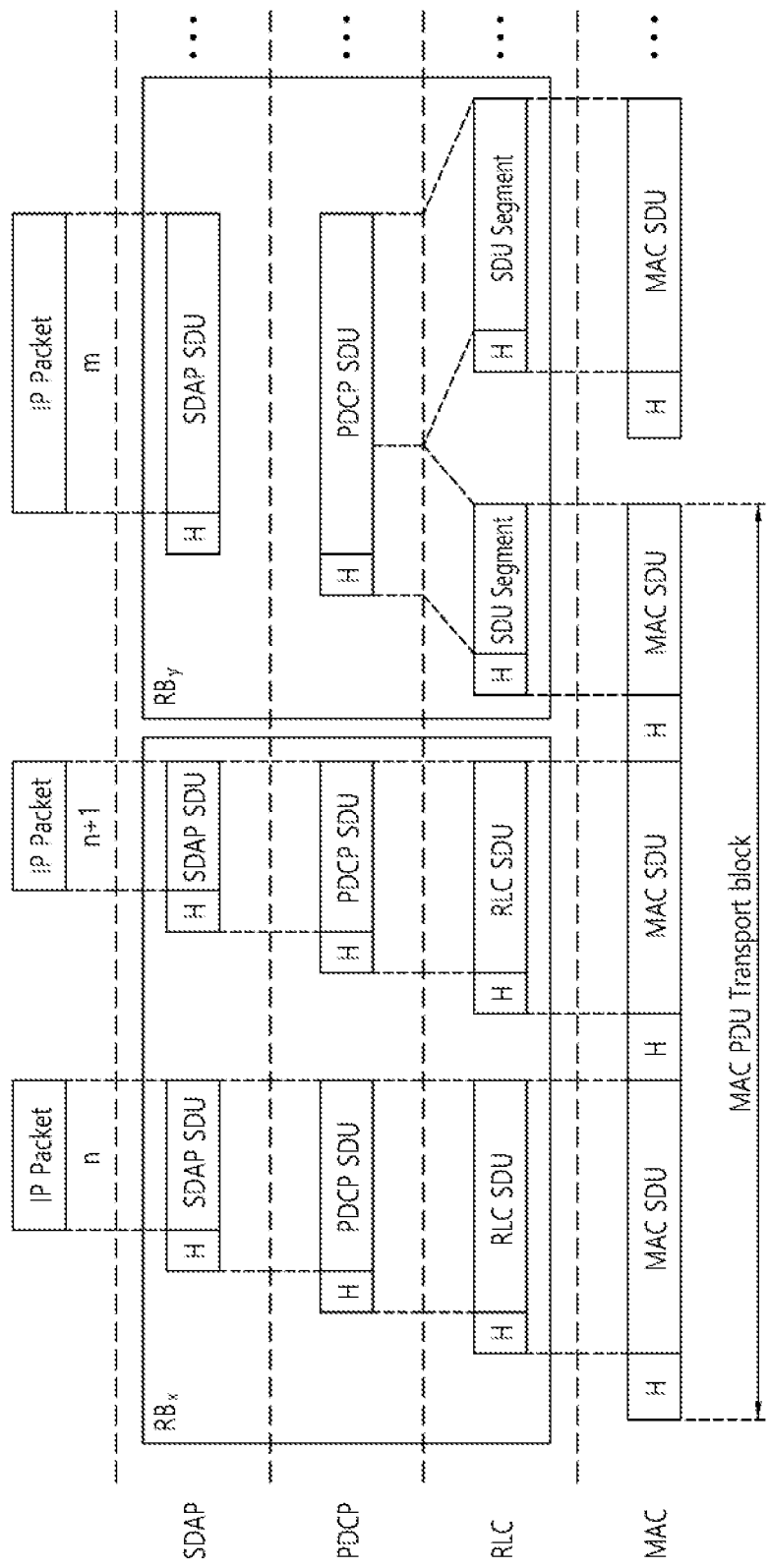
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to paging are described. Section 5.3.2 of 3GPP TS 38.331 v16.1.0 may be referred.

Figure 10:
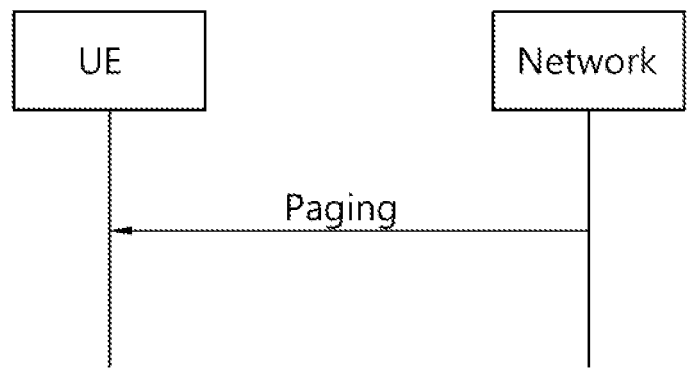
FIG. 10 shows an example of paging to which implementations of the present disclosure is applied.

FIG. 10 shows an example of paging to which implementations of the present disclosure is applied.

The purpose of this procedure is to transmit paging information to a UE in RRC_IDLE or RRC_INACTIVE.

The network initiates the paging procedure by transmitting the Paging message at the UE's paging occasion. The network may address multiple UEs within a Paging message by including one PagingRecord for each UE.

Hereinafter, an example of paging is described. The Paging message is used for the notification of one or more UEs. Table 5 shows an example of a paging message.

TABLE 5

-- ASN1START
-- TAG-PAGING-START
Paging ::=                        SEQUENCE {
    pagingRecordList              PagingRecordList
OPTIONAL, -- Need N
    lateNonCriticalExtension      OCTET STRING
OPTIONAL, TABLE 5-continued

```
  nonCriticalExtension          SEQUENCE{ }
OPTIONAL
}
PagingRecordList ::=            SEQUENCE (SIZE(1..maxNrofPageRec))
                                OF PagingRecord
PagingRecord ::=                SEQUENCE {
    ue-Identity                     PagingUE-Identity,
    accessType                      ENUMERATED {non3GPP}
                                    OPTIONAL, -- Need N
    ...
}
PagingUE-Identity ::=           CHOICE {
    ng-5G-S-TMSI                    NG-5G-S-TMSI,
    fullI-RNTI                      I-RNTI-Value,
    ...
}
-- TAG-PAGING-STOP
-- ASN1STOP
```

In table 5, the accessType may indicate whether the Paging message is originated due to the PDU sessions from the non-3GPP access.

Hereinafter, technical features related to paging are described. Section 7 of 3GPP TS 38.304 v16.1.0 may be referred.

Discontinuous Reception for paging is described.

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent. One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PDCCH monitoring occasions for paging are determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging are same as for RMSI.

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

A PO associated with a PF may start in the PF or after the PF.

The PDCCH monitoring occasions for a PO can span multiple radio frames. When SearchSpaceId other than 0 is configured for paging-SearchSpace the PDCCH monitoring occasions for a PO can span multiple periods of the paging search space.

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string. 5G-S-TMSI shall in the formulae above be interpreted as a binary number where the left most bit represents the most significant bit.

Hereinafter, technical features related to paging subgrouping are described.

UE receives its paging subgroup ID from network, or derive the paging subgroup ID using its UE ID.

UE receives the paging subgroup indication before its paging occasion.

If its paging subgroup ID is indicated in the received paging subgroup indication, UE receive the paging message in the paging occasion.

If the paging subgroup ID is not indicated in the received paging subgroup indication, UE does not receive the paging message in the corresponding paging occasion.

Hereinafter, technical features related to multicast session are described.

For the multicast session, the following states were defined:

Active multicast session: Established multicast session in active state. Multicast data are transmitted to UEs that joined the multicast session. 5GC resources for the multicast session are reserved. Corresponding Radio resources are reserved depending on participating UE locations. UEs that joined the multicast session are in CM CONNECTED state. UEs are allowed to join the multicast session (subject to authorization check).

Inactive multicast session: Established multicast session in inactive state. No multicast data are transmitted. UEs that joined the multicast session may be in CM CONNECTED or CM IDLE state. UEs are allowed to join the multicast session (subject to authorization check).

For broadcast, only session start/stop are applicable.

It is necessary for UE to receive the MBS Session activation notification (e.g., legacy paging) when it is served by a non-supporting NG-RAN node.

It is beneficial, e.g. for signalling efficiency, to support 5GC requesting NG-RAN nodes to notify session activation of an MBS session to UEs based on MBS session ID, at least to NG-RAN nodes supporting MBS.

As described above, to page UEs in RRC_IDLE/INACTIVE that are interested to receive a multicast service, group paging (that is, a paging message including a multicast service identifier, for example, an MBS Session activation notification) can be used. If the multicast service identifier of the interested multicast service is included in the received paging message, UE initiates RRC connection establishment procedure, to receive the multicast service of interest in RRC_CONNECTED.

On the other hand, in NR, a paging early indicator (PEI) including a subgroup ID is supported. If a UE has a specific subgroup ID, when the UE receives the PEI including the specific subgroup ID, the UE may monitor a paging occasion related to the PEI. If a UE has a specific subgroup ID, when the UE receives the PEI, not including the specific subgroup ID, the UE may not monitor a paging occasion related to the PEI.

Meanwhile, if UE in RRC_IDLE/INACTIVE wants to receive a multicast service, the UE should receive and read the paging message in every paging occasion since the UE doesn't know when the group paging is transmitted. This means that if UE wants to receive the multicast service, the UE should monitor the paging message more frequently, and spend more power for paging monitoring.

Therefore, studies for group paging in a wireless communication system are required.

Hereinafter, a method for group paging in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 11:
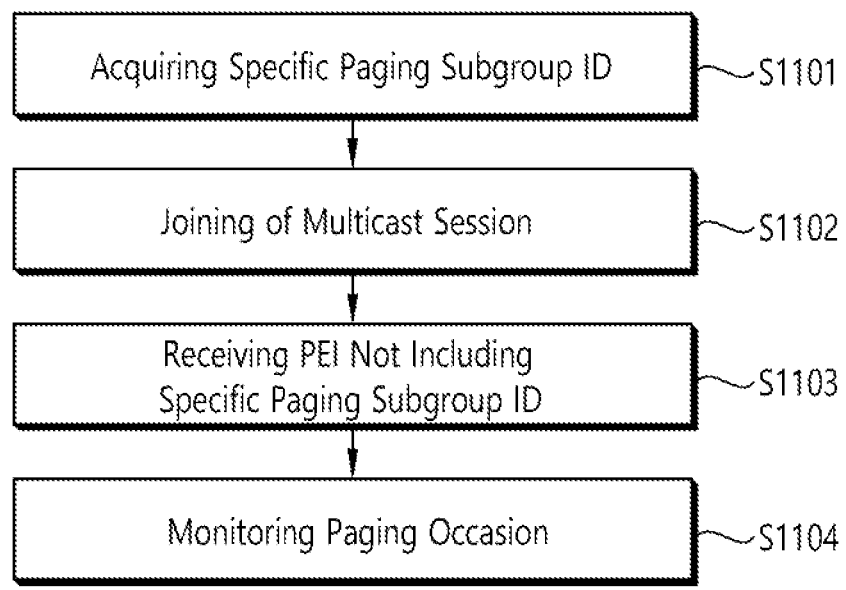
FIG. 11 shows an example of a method for group paging in a wireless communication system, according to some embodiments of the present disclosure.

FIG. 11 shows an example of a method for group paging in a wireless communication system, according to some embodiments of the present disclosure.

In particular, FIG. 11 shows an example of a method performed by a wireless device in a wireless communication system.

In step S1101, a wireless device may acquire a specific paging subgroup ID related to the wireless device.

For example, a wireless device may acquire a specific paging subgroup ID based on CN assigned subgrouping. For another example, a wireless device may acquire a specific paging subgroup ID based on UE_ID based subgrouping.

In step S1102, a wireless device may join a multicast session.

For example, the wireless device may want to receive a multicast service based on the multicast session. For example, the wireless device may receive, from a network, the multicast service based on the multicast session while in RRC_CONNECTED. The wireless device may pause to receive the multicast service and transition to RRC_IDLE or RRC_INACTIVE.

In step S1103, a wireless device may receive, from a network, a paging early indication (PEI) which does not include the specific paging subgroup ID.

For example, the PEI may include a subgroup ID that the wireless device does not belong to. For example, the PEI may include one or more subgroup IDs that the wireless device does not belong to.

For example, the wireless device may receive the PEI via a DCI format 2_7. That is, the PEI may be included in the DCI format 2_7. For example, the DCI format 2_7 is used for notifying the paging early indication and TRS availability indication for one or more UEs.

According to some embodiments of the present disclosure, a wireless device may receive, from the network, a PEI configuration via system information. Then, the wireless device may receive the PEI based on the PEI configuration. For example, the wireless device may receive the PEI configuration via a system information block type 1 (SIB1), before receiving the PEI.

In step S1104, a wireless device may monitor a paging occasion associated with the PEI, to receive an activation notification for the multicast session.

For example, the wireless device may receive a paging message from the paging occasion. The activation notification for the multicast session may be included in the paging message.

For example, the activation notification for the multicast session may be a session identifier (ID) of the multicast session.

According to some embodiments of the present disclosure, a wireless device may enter into an RRC_CONNECTED from an RRC_IDLE or an RRC_INACTIVE, based on receiving the activation notification for the multicast session.

Then, the wireless device may receive, from the network, a multicast service based on the multicast session.

According to some embodiments of the present disclosure, the wireless device may be in communication with at least one of a user equipment, a network, or an autonomous vehicle other than the wireless device.

Figure 12:
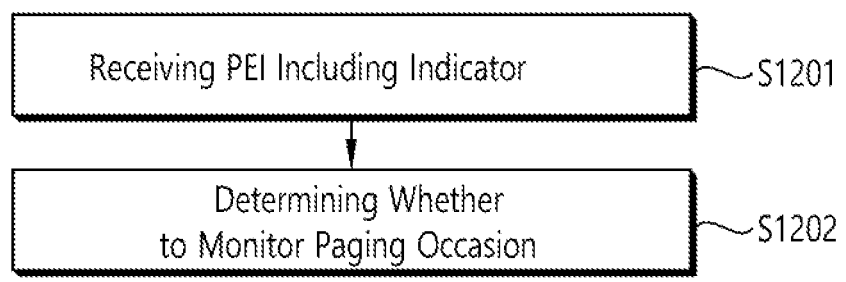
FIG. 12 shows an example of a method for group paging in a wireless communication system, according to some embodiments of the present disclosure.

FIG. 12 shows an example of a method for group paging in a wireless communication system, according to some embodiments of the present disclosure.

In particular, FIG. 12 shows an example of a method performed by a wireless device in a wireless communication system.

In step S1201, a wireless device may receive, from a network, a paging early indication (PEI) including an indicator informing whether a multicast session activation notification is transmitted in a paging occasion associated with the PEI.

In step S1202, a wireless device may determine whether to monitor the paging occasion associated with the PEI, based on the indicator.

For example, the indicator may inform that the multicast session activation notification is transmitted in a paging occasion associated with the PEI. In addition, the PEI may further include a subgroup ID that the wireless device does not belong to. In this case, the wireless device may determine to monitor the paging occasion associated with the PEI. The wireless device may receive the multicast session activation notification via the paging message by monitoring the paging occasion. The wireless device may enter into RRC_CONNECTED and receive a multicast service based on the multicast session activation notification.

For example, the indicator may inform that the multicast session activation notification is transmitted in a paging occasion associated with the PEI. In addition, the PEI may further include a subgroup ID that the wireless device belongs to. In this case, the wireless device may determine to monitor the paging occasion associated with the PEI. The wireless device may receive the multicast session activation notification via the paging message by monitoring the paging occasion. The wireless device may enter into RRC_CO- NNECTED and receive a multicast service based on the multicast session activation notification.

For example, the indicator may inform that the multicast session activation notification is not transmitted in a paging occasion associated with the PEI. In addition, the PEI may further include a subgroup ID that the wireless device does not belong to. In this case, the wireless device may determine not to monitor the paging occasion associated with the PEI.

For example, the indicator may inform that the multicast session activation notification is not transmitted in a paging occasion associated with the PEI. In addition, the PEI may further include a subgroup ID that the wireless device belongs to. In this case, the wireless device may determine to monitor the paging occasion associated with the PEI. The wireless device may receive the paging message by monitoring the paging occasion. The wireless device may enter into RRC_CONNECTED.

According to some embodiments of the present disclosure, the wireless device may be in communication with at least one of a user equipment, a network, or an autonomous vehicle other than the wireless device.

Hereinafter, examples of methods related to a group paging indicator in a wireless communication system will be described.

<Group Paging Indication in PEI or WUS>

For a UE that wants to receive a certain group paging, if the received paging early indication (PEI) (or wake-up signal (WUS)) indicates that the corresponding group paging will be transmitted within the following paging occasion, the UE may monitor the following paging occasion. If not, the UE may not monitor the following paging occasion.

For example, a UE is interested in a group paging for a multicast session. The UE may receive the paging early indication to decide whether to monitor the following paging occasion. If the received paging early indication indicates that the group paging for a multicast session will be transmitted, the UE may monitor the following paging occasion.

For a UE that wants to receive a certain group paging and has a paging subgroup ID, if the received paging early indication (or wake-up signal) indicates that the corresponding group paging will be transmitted within the following paging occasion, or if the paging subgroup ID is indicated in the received paging early indication, the UE may monitor the following paging occasion. If not, the UE may not monitor the following paging occasion.

[Session join] For a UE that has joined a multicast session, if the received paging early indication (or wake-up signal) indicates that the group paging for a multicast session will be transmitted within the following paging occasion, the UE may monitor the following paging occasion. If not, the UE may not monitor the following paging occasion.

For a UE that has joined a multicast session and has a paging subgroup ID, if the received paging early indication (or wake-up signal) indicates that the group paging for a multicast session will be transmitted within the following paging occasion, or if the paging subgroup ID is indicated in the received paging early indication, the UE may monitor the following paging occasion. If not, the UE may not monitor the following paging occasion.

[Interest] For a UE that is interested in a multicast session, if the received paging early indication (or wake-up signal) indicates that the group paging for a multicast session will be transmitted within the following paging occasion, the UE may monitor the following paging occasion. If not, the UE may not monitor the following paging occasion.

[Group paging] The group paging for a multicast session may be used to notify UEs in RRC_IDLE or INACTIVE of the activation of the multicast session. If the identity of the multicast session that the UE has joined is included in the received paging message, the UE may establish RRC connection to receive the multicast session in RRC_CONNECTED.

[Group paging indication] The paging early indication may be transmitted ahead of the paging occasion. The paging early indication may include the paging subgroup ID(s) and/or the group paging indication. UE may monitor the paging early indication to decide whether to monitor the following paging occasion. The group paging indicator, or paging early indication including the group paging indicator may be transmitted before every paging occasion, or may be transmitted before a group of paging occasions.

<Monitoring of Subgroup Indication Based on the Interest of Group Paging>

For a UE that Supports the Paging Subgroup, the UE May not Monitor the paging subgroup indication if the UE wants to receive the group paging (for example, if the UE has joined a multicast session).

For a UE that supports the paging subgroup, the UE may monitor/receive the paging subgroup indicator if the UE doesn't want to receive the group paging (for example, if the UE hasn't joined any multicast session).

For a UE that supports the paging subgroup, the UE may not monitor the paging early indicator or wake-up signal if the UE wants to receive the group paging (for example, if the UE has joined a multicast session).

For a UE that supports the paging subgroup, the UE may monitor/receive the paging early indicator or wake-up signal if the UE doesn't want to receive the group paging (for example, if the UE hasn't joined any multicast session).

<Applying the Subgroup Indication Based on the Interest of Group Paging>

For a UE that supports the paging subgroup, if the UE wants to receive the group paging (for example, if the UE has joined a multicast session), the UE may monitor the following paging occasion regardless of whether the subgroup ID that the UE belongs to is included in the received subgroup indicator or not.

For a UE that supports the paging subgroup, the UE may not monitor the following paging occasion, if the subgroup ID that the UE belongs to is not included in the received subgroup indicator, and if the UE doesn't want to receive the group paging (for example, if the UE has joined no multicast session).

Figure 13:
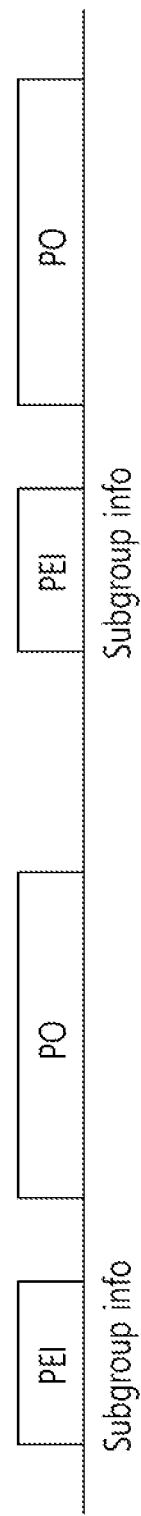
FIG. 13 shows an example of a Paging Early Indication and a Paging Occasion.

FIG. 13 shows an example of a Paging Early Indication and a Paging Occasion.

Referring to FIG. 13, a Paging Occasion (PO) may be associated with one Paging Early Indication (PEI). That is, one PEI may be transmitted before one PO. In addition, a PEI may include subgroup information (for example, a subgroup ID).

A wireless device may determine whether to monitor the PO by considering the subgroup information included in the PEI.

For example, if the PEI includes a subgroup ID that the wireless device belongs to, the wireless device may monitor the PO associated with the PEI.

For example, if the PEI includes a subgroup ID that the wireless device does not belong to, and if the wireless device expects multicast session activation notification (that is, the wireless device has joined a multicast session(s)), the wireless device may monitor the PO associated with the PEI.

For example, if the PEI includes a subgroup ID that the wireless device does not belong to, and if the wireless device does not expect multicast session activation notification (that is, the wireless device has not joined a multicast session(s)), the wireless device may not monitor the PO associated with the PEI.

Figure 14:
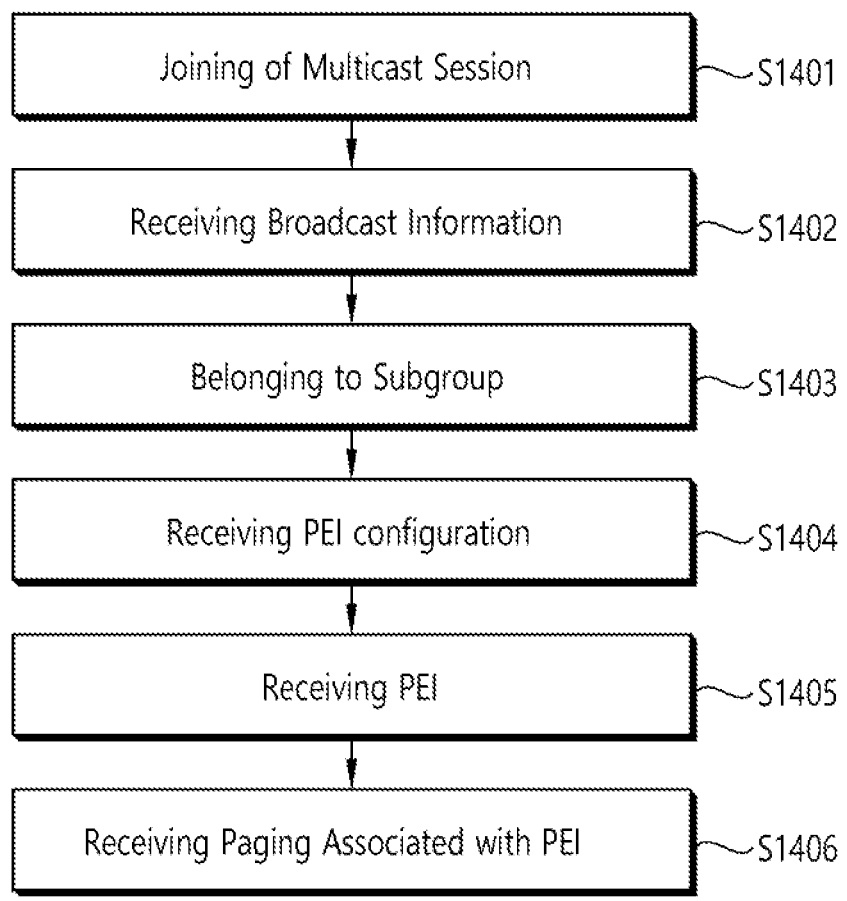
FIG. 14 shows an example of UE operations for group paging in a wireless communication system, according to some embodiments of the present disclosure.

FIG. 14 shows an example of UE operations for group paging in a wireless communication system, according to some embodiments of the present disclosure.

In step S1401, a UE may join a multicast session.

For example, a UE may receive, from a network, a multicast service based on the multicast session while in RRC_CONNECTED. The UE may pause to receive the multicast service and transition to RRC_IDLE or RRC_INACTIVE.

In step S1402, a UE may receive broadcast information.

For example, a UE receiving or interested to receive MBS broadcast services shall apply the MCCH information acquisition procedure to receive the MCCH information. A UE interested to receive MBS broadcast services identifies if a service that it is interested to receive is started or ongoing by receiving the MCCH information, and then receives an MTCH(s) configured using the Broadcast MRB establishment procedure and using the DL-SCH reception and MBS broadcast DRX procedure.

For example, UEs which have joined a multicast session(s) and are in RRC_IDLE/RRC_INACTIVE state shall apply the reception of the paging message procedure to receive notification of the multicast session activation.

In step S1403, a UE may belong to a subgroup.

If PEI and subgrouping are configured, UEs monitoring the same PO can be divided into one or more subgroups. With subgrouping, the UE monitors PO if the corresponding bit for subgroup the UE belongs to is indicated as 1 by PEI corresponding to its PO. UE's subgroup can be either assigned by CN or formed based on UE_ID:

- If subgroupsNumForUEID is absent in subgroupConfig, the subgroup ID based on CN assigned subgrouping is used in the cell.
- If both subgroupsNumPerPO and subgroupsNumForUEID are configured, and subgroupsNumForUEID has the same value as subgroupsNumPerPO, the subgroup ID based on UE_ID based subgrouping is used in the cell.
- If both subgroupsNumPerPO and subgroupsNumForUEID are configured, and subgroupsNumForUEID<subgroupsNumPerPO, the subgroup ID based on CN assigned subgrouping, if available for the UE, is used in the cell; otherwise, the subgroup ID based on UE_ID based subgrouping.

The following parameters are used for the determination of subgroup ID:
subgroupsNumPerPO: number of subgroups for total CN assigned subgrouping (if any) and UE_ID based subgrouping (if any) in a PO, which is broadcasted in system information;
subgroupsNumForUEID: number of subgroups for UE_ID based subgrouping in a PO, which is broadcasted in system information.

If a UE has no CN assigned subgroup ID or does not support CN-assigned subgrouping, and there is no configuration for subgroupsNumForUEID, the UE monitors paging in its associated PO.

For example, CN assigned subgrouping is described.

Paging with CN assigned subgrouping is used in the cell which supports CN assigned subgrouping. A UE supporting CN assigned subgrouping in RRC_IDLE or RRC_INACTIVE state can be assigned a subgroup ID (between 0 to 7) by AMF through NAS signalling. The UE belonging to the assigned subgroup ID monitors its associated PEI which indicates the paged subgroup(s).

For example, UE_ID based subgrouping is described.

Paging with UE_ID based subgrouping is used in the cell which supports UE_ID based subgrouping.

If the UE is not configured with a CN assigned subgroup ID, or if the UE configured with a CN assigned subgroup ID is in a cell supporting only UE_ID based subgrouping, the subgroup ID of the UE is determined by below formula:

$$\text{SubgroupID} = (\text{floor}(UE\_ID/(N*Ns))) \bmod \text{subgroupsNumForUEID}) + (\text{subgroupsNumPerPO} - \text{subgroupsNumForUEID}),$$

where:
N: number of total paging frames in T
Ns: number of paging occasions for a PF
UE_ID: 5G-S-TMSI mod X, where X is 32768, if eDRX is applied; otherwise, X is 8192
subgroupsNumForUEID: number of subgroups for UE_ID based subgrouping in a PO, which is broadcasted in system information The UE belonging to the SubgroupID monitors its associated PEI which includes the paged subgroup(s).

In step S1404, a UE may receive a Paging Early Indication (PEI) configuration.

For example, the wireless device may receive the PEI configuration via a system information block type 1 (SIB1). For example, the SIB1 may include a Serving Cell Config Common SIB. The Serving Cell Config Common SIB may include a downlink Config Common SIB. The downlink Config Common SIB may include the PEI configuration.

Table 6 shows an example of the PEI configuration.

TABLE 6

| | |
|---|---|
| PEI-Config-r17 ::= | SEQUENCE { |
| pei-SearchSpace-r17 | SearchSpaceId, |
| po-NumPerPET-r17 | ENUMERATED {po1, po2, po4, po8}, |
| payloadSizeDCI-2-7-r17 | INTEGER (1..maxDCI-2-7-Size-r17), |
| pei-FrameOffset-r17 | INTEGER (0..16), |
| firstPDCCH-MonitoringOccasionOfPEI-O-r17 | CHOICE { |
| sCS15KHZoneT-r17 | |
| SEQUENCE (SIZE (1..maxPEI-perPF-r17)) OF INTEGER (0..139), | |
| sCS30KHZoneT-SCS15KHZhalfT-r17 | |
| SEQUENCE (SIZE (1..maxPEI-perPF-r17)) OF INTEGER (0..279), | |
| sCS60KHZoneT-SCS30KHZhalfT-SCS15KHZquarterT-r17 | |
| SEQUENCE (SIZE (1..maxPEI-perPF-r17)) OF INTEGER (0..559), | |
| sCS120KHZoneT-SCS60KHZhalfT-SCS30KHZquarterT-SCS15KHZoneEighthT-r17 SEQUENCE (SIZE (1..maxPEI-perPF-r17)) OF INTEGER (0..1119), | |

TABLE 6-continued

```
    sCS120KHZhalfT-SCS60KHZquarterT-SCS30KHZoneEighthT-
SCS15KHZoneSixteenthT-r17 SEQUENCE (SIZE (1..maxPEI-perPF-r17)) OF INTEGER
(0..2239),
    sCS120KHZquarterT-SCS60KHZoneEighthT-SCS30KHZoneSixteenthT-r17
SEQUENCE (SIZE (1..maxPEI-perPF-r17)) OF INTEGER (0..4479),
    sCS120KHZoneEighthT-SCS60KHZoneSixteenthT-r17
SEQUENCE (SIZE (1..maxPEI-perPF-r17)) OF INTEGER (0..8959),
    sCS120KHZoneSixteenthT-r17
SEQUENCE (SIZE (1..maxPEI-perPF-r17)) OF INTEGER (0..17919)
  },
  subgroupConfig-r17                    SubgroupConfig-r17,
  lastUsedCellOnly-r17                  ENUMERATED {true}
OPTIONAL, -- Need R
  ...
 }
```

Referring to table 6, for example, the PEI configuration may include (i) information on a PEI Search Space, (ii) information on a PEI Frame Offset, (iii) information on a PO number per PEI, (iv) information on the first PDCCH-Monitoring Occasion Of PEI-O, and (v) information on the payload Size DCI-2-7.

For example, information on the PEI Search Space may include ID of dedicated search space for PEI. It can be configured to one of up to 4 common SS sets configured by commonSearchSpaceList with SearchSpaceId>0. The CCE aggregation levels and maximum number of PDCCH candidates per CCE aggregation level. SearchSpaceId=0 can be configured for the case of SS/PBCH block and CORESET multiplexing pattern 2 or 3.

For example, information on the PEI Frame Offset may include information on an offset, in number of frames from the start of a first paging frame of the paging frames associated with the PEI-O to the start of a reference frame for PEI-O.

For example, information on the PO number per PEI may include information on the number of PO(s) associated with one PEI monitoring occasion. It is a factor of N×Ns (total PO number in a paging cycle). The Maximum number of PF associated with one PEI monitoring occasion is up to 2. The number of PO mapping to one PEI should be multiple of Ns when po-NumPerPEI is larger than Ns.

For example, information on the first PDCCH-Monitoring Occasion Of PEI-O may include information on an offset, in number of symbols, from the start of the reference frame for PEI-O to the start of the first PDCCH monitoring occasion of PEI-O. For the case po-NumPerPEI is smaller than Ns, UE applies the (floor(i_s/poNumPerPEI)+1)-th value out of (N_s/po-NumPerPEI) configured values in firstPDCCH-MonitoringOccasionOfPEI-O for the symbol-level offset. When po-NumPerPEI is one or multiple of Ns, UE applies the first configured value in firstPDCCH-MonitoringOccasionOfPEI-O for the symbol-level offset.

For example, information on a payload Size DCI-2-7 may include information on a Payload size of PEI DCI, i.e., DCI format 2_7. The size is no larger than the payload size of paging DCI which has maximum of 41 bits and 43 bits for licensed and unlicensed spectrums, respectively.

In step S1405, a UE may receive a PEI.

The UE may use Paging Early Indication (PEI) in RRC_IDLE and RRC_INACTIVE states in order to reduce power consumption. If PEI configuration is provided in system information, the UE in RRC_IDLE or RRC_INACTIVE state supporting PEI (except for the UEs expecting multicast session activation notification) can monitor PEI using PEI parameters in system information according to the procedure described below.

If lastUsedCellOnly is configured in system information of a cell, the UE monitors PEI only in the cell if the UE most recently entered RRC_IDLE or RRC_INACTIVE states in this cell. Otherwise, the UE monitors PEI in the camped cell regardless of which cell the UE most recently entered RRC_IDLE or RRC_INACTIVE states.

The UE monitors one PEI occasion per DRX cycle. A PEI occasion (PEI-O) is a set of PDCCH monitoring occasions (MOs) and can consist of multiple time slots (e.g. subframe or OFDM symbol) where PEI can be sent.

The time location of PEI-O for UE's PO is determined by a reference point and an offset from the reference point to the start of the first PDCCH monitoring occasion of this PEI-O:

The reference point is the start of a reference frame determined by a frame-level offset from the start of the first PF of the PF(s) associated with the PEI-O, provided by PEI-F_offset in SIB1;

The offset is a symbol-level offset from the reference point to the start of the first PDCCH MO of PEI-O, provided by firstPDCCH-MonitoringOccasionOfPEI-O in SIB1.

If one PEI-O is associated with POs of two PFs, the two PFs are consecutive PFs calculated by the parameters PF_offset, T, Ns, and N. The first PF of the PFs associated with the PEI-O is provided by ((SFN for PF)–floor (i$_{PO}$/Ns) *T/N, i$_{PO}$=((UE_ID mod N)*Ns+i_s)mod po-NumPerPEI, and po-NumPerPEI is configured via SIB, T, Ns, and N are determined.

The PDCCH monitoring occasions for PEI are determined according to pei-SearchSpace, PEI-F_offset, firstPDCCH-MonitoringOccasionOfPEI-O and nrofPDCCH-MonitoringOccasionPerSSB-InPO if configured. When SearchSpaceId=0 is configured for pei-SearchSpace, the PDCCH monitoring occasions for PEI are same as for RMSI. UE determines first PDCCH MO for PEI-O based on PEI-F_offset and firstPDCCH-MonitoringOccasionOfPEI-O, as for the case with SearchSpaceId>0 configured.

When SearchSpaceId=0 is configured for peiSearchSpac, the UE monitors the PEI-O according to searchSpaceZero. When SearchSpaceId other than 0 is configured for peiSearchSpace, the UE monitors the PEI-O according to the SearchSpace of the configured SearchSpaceId.

A PEI occasion is a set of 'S*X' consecutive PDCCH monitoring occasions, where 'S' is the number of actual transmitted SSBs determined according to ssb-PositionsInBurst in SIB1, and X is the nrofPDCCH-MonitoringOccasionPerSSB-InPO if configured or is equal to 1 otherwise. The [x*S+K]$^{th}$ PDCCH monitoring occasion for PEI in the PEI occasion corresponds to the K$^{th}$ transmitted SSB, where x=0, 1, ..., X−1, K=1, 2, ..., S. The PDCCH monitoring occasions for PEI which do not overlap with UL symbols (determined according to tdd-UL-DL-ConfigurationCommon) are sequentially numbered from zero starting from the first PDCCH monitoring occasion for PEI in the PEI-O. When the UE detects a PEI within its PEI-O, the UE is not required to monitor the subsequent monitoring occasion(s) associated with the same PEI-O.

If the UE detects PEI and the PEI indicates the subgroup the UE belongs to to monitor its associated PO, the UE monitors the associated PO. If the UE does not detect PEI on the monitored PEI occasion or the PEI does not indicate the subgroup the UE belongs to to monitor its associated PO, the UE is not required to monitor the associated PO.

If the UE is unable to monitor the PEI occasion (i.e. all valid PDCCH monitoring occasion for PEI) corresponding to its PO, e.g. during cell re-selection, the UE monitors the associated PO.

For example, the wireless device may receive the PEI via a DCI format 2_7. That is, the PEI may be included in the DCI format 2_7.

For example, the DCI format 2_7 is used for notifying the paging early indication and TRS availability indication for one or more UEs.

The following information is transmitted by means of the DCI format 2_7 with CRC scrambled by PEI-RNTI:

Paging indication field—$N_{PO}^{PEI}N_{SG}^{PO}$ bit(s), where $N_{PO}^{PEI}$ is the number of paging occasions configured by higher layer parameter PONumPerPEI;

$N_{SG}^{PO}$ is the number of sub-groups of a paging occasion configured by higher layer parameter subgroupsNumPerPO, if subgroupsNumPerPO is configured; otherwise $N_{SG}^{PO}$ is set to 1.

Each bit in the field indicates one UE subgroup of a paging occasion if subgroupsNumPerPO is configured; otherwise each bit in the field indicates the UE group of a paging occasion.

TRS availability indication—1, 2, 3, 4, 5, or 6 bits if TRS-ResourceSetConfig is configured; 0 bits otherwise.

The size of DCI format 2_7 is indicated by the higher layer parameter payloadSizeDCI_format2_7. The number of information bits in format 2_7 shall be equal to or less than the payload size of format 2_7. If the number of information bits in format 2_7 is less than the size of format 2_7, the remaining bits are reserved.

In step S1406, a UE may receive a paging associated with the received PEI.

For example, the UE may monitor a paging occasion associated with the received PEI in step S1405, to receive an activation notification for the multicast session (that is, multicast session activation notification), even though the PEI does not include a paging subgroup ID that the UE belongs to.

For example, Discontinuous Reception for paging may be performed by the UE. The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent. One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS. However, if a L2 U2N Relay UE in RRC_INACTIVE state receives a CN initiated paging for a L2 U2N Remote UE, the L2 U2N Relay UE does not move to RRC_IDLE state.

The L2 U2N Remote UE does not need to monitor the PO in order to receive the paging message.

The PF and PO for paging are determined by the following formulae:

SFN for the PF is determined by:

(SFN+PF_offset)mod $T$=($T$ div $N$)*(UE_ID mod $N$)

Index (i_s), indicating the index of the PO is determined by:

i_s=floor(UE_ID/$N$)mod $Ns$

The PDCCH monitoring occasions for paging are determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging are same as for RMSI.

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)$^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The [x*S+K]$^{th}$ PDCCH monitoring occasion for paging in the PO corresponds to the K$^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

A PO associated with a PF may start in the PF or after the PF.

The PDCCH monitoring occasions for a PO can span multiple radio frames.

When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE.

If eDRX is not configured:

T is determined by the shortest of the UE specific DRX value(s), if configured by RRC and/or upper layers, and a default DRX value broadcast in system information.

In RRC_IDLE state, if UE specific DRX is not configured by upper layers, the default value is applied.

In RRC_IDLE state, if eDRX is configured by upper layers, i.e., $T_{eDRX, CN}$:

If $T_{eDRX, CN}$ is no longer than 1024 radio frames: $T = T_{eDRX, CN}$;

else:

During CN configured PTW, T is determined by the shortest of UE specific DRX value, if configured by upper layers, and the default DRX value broadcast in system information.

In RRC_INACTIVE state, if eDRX is configured by RRC, i.e., $T_{eDRX, RAN}$, and/or upper layers, i.e., $T_{eDRX, CN}$:

If both $T_{eDRX, CN}$ and $T_{eDRX, RAN}$ are no longer than 1024 radio frames, $T = \min\{T_{eDRX, RAN}, T_{eDRX, CN}\}$.

If $T_{eDRX, CN}$ is no longer than 1024 radio frames and no $T_{eDRX, RAN}$ is configured, $T = \min\{T_{eDRX, RAN}, T_{eDRX, CN}\}$ If $T_{eDRX, CN}$ is longer than 1024 radio frames:

If $T_{eDRX, RAN}$ is not configured:

During CN configured PTW, T is determined by the shortest of the UE specific DRX value (s), $T_{eDRX, RAN}$ and/or $T_{eDRX, CN}$ if configured, and a default DRX value broadcast in system information. Outside the CN configured PTW, T is determined by the DRX value configured by RRC;—else if $T_{eDRX, RAN}$ is no longer than 1024 radio frames:

During CN configured PTW, T is determined by the shortest of the UE specific DRX value, $T_{eDRX, CN}$ and $T_{eDRX, RAN}$ if configured and a default DRX value broadcast in system information. Outside the CN configured PTW, T is determined by $T_{eDRX, RAN}$.

N: number of total paging frames in T

Ns: number of paging occasions for a PF

PF_offset: offset used for PF determination

UE_ID:

If an eDRX cycle is configured by RRC or upper layers and eDRX-Allowed is signalled in SIB1:

5G-S-TMSI mod 4096 else:

5G-S-TMSI mod 1024

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string. 5G-S-TMSI shall in the formulae above be interpreted as a binary number where the left most bit represents the most significant bit.

In RRC_INACTIVE state, if the UE supports inactiveStatePO-Determination and the network broadcasts ranPagingInIdlePO with value "true", the UE shall use the same i_s as for RRC_IDLE state. Otherwise, the UE determines the i_s based on the parameters and formula above.

In RRC_INACTIVE state, if eDRX value configured by upper layers is no longer than 1024 radio frames, the UE shall use the same i_s as for RRC_IDLE state.

In RRC_INACTIVE state, if eDRX value configured by upper layers is longer than 1024 radio frames, during CN PTW, the UE shall use the same i_s as for RRC_IDLE state.

Table 7 shows an example of paging message, according to some embodiments of the present disclosure. For example, the UE may receive the paging message below, in step S1406.

The Paging message is used for the notification of one or more UEs.

For the paging message, the following configurations may be applied.

Signalling radio bearer: N/A
RLC-SAP: TM
Logical channel: PCCH
Direction: Network to UE

TABLE 7

```
-- ASN1START
-- TAG-PAGING-START
Paging ::=                         SEQUENCE {
    pagingRecordList               PagingRecordList
OPTIONAL, -- Need N
    lateNonCriticalExtension       OCTET STRING
OPTIONAL,
    nonCriticalExtension           Paging-v1700-IEs
OPTIONAL
}
Paging-v1700-IEs ::=               SEQUENCE {
    pagingRecordList-v1700         PagingRecordList-v1700
OPTIONAL, -- Need N
    pagingGroupList-r17            PagingGroupList-r17
OPTIONAL,
    nonCriticalExtension           SEQUENCE { }
OPTIONAL
}
PagingRecordList ::=               SEQUENCE
                                   (SIZE(1..maxNrofPageRec)) OF
PagingRecord
    PagingRecordList-v1700 ::=     SEQUENCE
                                   (SIZE(1..maxNrofPageRec)) OF
PagingRecord-v1700
    PagingGroupList-r17 ::=        SEQUENCE
                                   (SIZE(1..maxNrofPageGroup-
r17)) OF TMGI-r17
    PagingRecord ::=               SEQUENCE {
        ue-Identity                PagingUE-Identity,
        accessType                 ENUMERATED {non3GPP}
                                   OPTIONAL,
-- Need N
    ...
}
PagingRecord-v1700 ::=             SEQUENCE {
    pagingCause-r17                ENUMERATED {voice}
                                   OPTIONAL
-- Need N
}
PagingUE-Identity ::=              CHOICE {
    ng-5G-S-TMSI                   NG-5G-S-TMSI,
    fullI-RNTI                     I-RNTI-Value,
    ...
}
-- TAG-PAGING-STOP
-- ASN1STOP
``` accessType: Indicates whether the Paging message is originated due to the PDU sessions from the non-3GPP access.

pagingRecordList: If the network includes pagingRecordList-v1700, it includes the same number of entries, and listed in the same order, as in pagingRecordList (i.e. without suffix).

pagingCause: Indicates whether the Paging message is originated due to IMS voice. If this field is present and upper layers indicate the support of paging cause, it implies that the corresponding paging entry is for IMS voice. If this field is not present but pagingRecordList-v1700 is present, it implies that the corresponding paging entry is for a service other than IMS voice. Otherwise, pagingCause is undetermined.

Some of the detailed steps shown in the example of FIGS. 11, 12, 13, and 14 may not be essential steps and may be omitted. In addition, steps other than the steps shown in FIGS. 11, 12, 13, and 14 may be added, and the order of the steps may vary. Some of the above steps may have their own technical meaning.

Hereinafter, an apparatus for group paging in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to acquire a specific paging subgroup identifier (ID) related to the wireless device. The processor 102 may be configured to join a multicast session. The processor 102 may be configured to control the transceiver 106 to receive, from a network, a paging early indication (PEI) which does not include the specific paging subgroup ID. The processor 102 may be configured to monitor a paging occasion associated with the PEI, to receive an activation notification for the multicast session.

For example, the processor 102 may be configured to control the transceiver 106 to receive, from the network, a PEI configuration via system information.

For example, the processor 102 may be configured to control the transceiver 106 to receive a paging message from the paging occasion. The activation notification for the multicast session may be included in the paging message.

For example, the activation notification for the multicast session may be a session identifier (ID) of the multicast session.

For example, the processor 102 may be configured to enter into a Radio Resource Control (RRC)_CONNECTED from an RRC_IDLE or an RRC_INACTIVE, based on receiving the activation notification for the multicast session.

For example, the processor 102 may be configured to control the transceiver 106 to receive, from the network, a multicast service based on the multicast session.

For example, the PEI may include a subgroup ID that the wireless device does not belong to.

According to some embodiments of the present disclosure, the processor 102 may be configured to control the transceiver 106 to receive, from a network, a paging early indication (PEI) including an indicator informing whether a multicast session activation notification is transmitted in a paging occasion associated with the PEI. The processor 102 may be configured to determine whether to monitor the paging occasion associated with the PEI, based on the indicator.

For example, the indicator may inform that the multicast session activation notification is transmitted in a paging occasion associated with the PEI. When the PEI further includes a subgroup ID that the wireless device does not belong to, it may be determined to monitor the paging occasion associated with the PEI. When the PEI further includes a subgroup ID that the wireless device belongs to, it may be determined to monitor the paging occasion associated with the PEI.

For example, the indicator may inform that the multicast session activation notification is not transmitted in a paging occasion associated with the PEI. When the PEI further includes a subgroup ID that the wireless device does not belong to, it may be determined not to monitor the paging occasion associated with the PEI. When the PEI further includes a subgroup ID that the wireless device belongs to, it may be determined to monitor the paging occasion associated with the PEI.

According to some embodiments of the present disclosure, the processor 102 may be configured to be in communication with at least one of a user equipment, a network, or an autonomous vehicle other than the wireless device.

Hereinafter, a processor for a wireless device for group paging in a wireless communication system, according to some embodiments of the present disclosure, will be described.

The processor may be configured to control the wireless device to acquire a specific paging subgroup identifier (ID) related to the wireless device. The processor may be configured to control the wireless device to join a multicast session. The processor may be configured to control the wireless device to receive, from a network, a paging early indication (PEI) which does not include the specific paging subgroup ID. The processor may be configured to control the wireless device to monitor a paging occasion associated with the PEI, to receive an activation notification for the multicast session.

For example, the processor may be configured to control the wireless device to receive, from the network, a PEI configuration via system information.

For example, the processor may be configured to control the wireless device to receive a paging message from the paging occasion. The activation notification for the multicast session may be included in the paging message.

For example, the activation notification for the multicast session may be a session identifier (ID) of the multicast session.

For example, the processor may be configured to control the wireless device to enter into a Radio Resource Control (RRC)_CONNECTED from an RRC_IDLE or an RRC_INACTIVE, based on receiving the activation notification for the multicast session.

For example, the processor may be configured to control the wireless device to receive, from the network, a multicast service based on the multicast session.

For example, the PEI may include a subgroup ID that the wireless device does not belong to.

According to some embodiments of the present disclosure, the processor may be configured to control the wireless device to receive, from a network, a paging early indication (PEI) including an indicator informing whether a multicast session activation notification is transmitted in a paging occasion associated with the PEI. The processor may be configured to control the wireless device to determine whether to monitor the paging occasion associated with the PEI, based on the indicator.

For example, the indicator may inform that the multicast session activation notification is transmitted in a paging occasion associated with the PEI. When the PEI further includes a subgroup ID that the wireless device does not belong to, it may be determined to monitor the paging occasion associated with the PEI. When the PEI further includes a subgroup ID that the wireless device belongs to, it may be determined to monitor the paging occasion associated with the PEI.

For example, the indicator may inform that the multicast session activation notification is not transmitted in a paging occasion associated with the PEI. When the PEI further includes a subgroup ID that the wireless device does not belong to, it may be determined not to monitor the paging occasion associated with the PEI. When the PEI further includes a subgroup ID that the wireless device belongs to, it may be determined to monitor the paging occasion associated with the PEI.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for group paging in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For another example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to acquire a specific paging subgroup identifier (ID) related to the wireless device. The stored a plurality of instructions may cause the wireless device to join a multicast session. The stored a plurality of instructions may cause the wireless device to receive, from a network, a paging early indication (PEI) which does not include the specific paging subgroup ID. The stored a plurality of instructions may cause the wireless device to monitor a paging occasion associated with the PEI, to receive an activation notification for the multicast session.

For example, the stored a plurality of instructions may cause the wireless device to receive, from the network, a PEI configuration via system information.

For example, the stored a plurality of instructions may cause the wireless device to receive a paging message from the paging occasion. The activation notification for the multicast session may be included in the paging message.

For example, the activation notification for the multicast session may be a session identifier (ID) of the multicast session.

For example, the stored a plurality of instructions may cause the wireless device to enter into a Radio Resource Control (RRC)_CONNECTED from an RRC_IDLE or an RRC_INACTIVE, based on receiving the activation notification for the multicast session.

For example, the stored a plurality of instructions may cause the wireless device to receive, from the network, a multicast service based on the multicast session.

For example, the PEI may include a subgroup ID that the wireless device does not belong to.

According to some embodiments of the present disclosure, the stored a plurality of instructions may cause the wireless device to receive, from a network, a paging early indication (PEI) including an indicator informing whether a multicast session activation notification is transmitted in a paging occasion associated with the PEI. The stored a plurality of instructions may cause the wireless device to determine whether to monitor the paging occasion associated with the PEI, based on the indicator.

For example, the indicator may inform that the multicast session activation notification is transmitted in a paging occasion associated with the PEI. When the PEI further includes a subgroup ID that the wireless device does not belong to, it may be determined to monitor the paging occasion associated with the PEI. When the PEI further includes a subgroup ID that the wireless device belongs to, it may be determined to monitor the paging occasion associated with the PEI.

For example, the indicator may inform that the multicast session activation notification is not transmitted in a paging occasion associated with the PEI. When the PEI further includes a subgroup ID that the wireless device does not belong to, it may be determined not to monitor the paging occasion associated with the PEI. When the PEI further includes a subgroup ID that the wireless device belongs to, it may be determined to monitor the paging occasion associated with the PEI.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for group paging in a wireless communication system, according to some embodiments of the present disclosure, will be described.

The BS may transmit (that is, broadcast) a paging early indication (PEI) including (i) the specific paging subgroup ID and/or (ii) an indicator informing whether a multicast session activation notification is transmitted in a paging occasion associated with the PEI. The BS may transmit (that is, broadcast) a paging message via a paging occasion associated with the PEI.

Hereinafter, a base station (BS) for group paging in a wireless communication system, according to some embodiments of the present disclosure, will be described.

The BS may include a transceiver, a memory, and a processor operatively coupled to the transceiver and the memory.

The processor may be configured to control the transceiver to transmit (that is, broadcast) a paging early indication (PEI) including (i) the specific paging subgroup ID and/or (ii) an indicator informing whether a multicast session activation notification is transmitted in a paging occasion associated with the PEI. The processor may be configured to control the transceiver to transmit (that is, broadcast) a paging message via a paging occasion associated with the PEI.

The present disclosure can have various advantageous effects.

According to some embodiments of the present disclosure, a wireless device could efficiently receive the group paging.

For example, a wireless device could avoid missing the group notification for a multicast session activation, while it is interested in the multicast session, by monitoring the associated paging occasion.

For example, a wireless device could avoid missing the group notification for a multicast session activation by monitoring the associated paging occasion, even though the PEI does not indicate the subgroup the UE belongs to.

According to some embodiments of the present disclosure, when a wireless device wants to receive the group paging, the wireless device can save the power.

For example, when a wireless device wants to receive the group paging, the wireless device can save the power, by skipping the monitoring the paging occasion when the paging early indicator indicates that the group paging is not transmitted in the following paging occasion.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
configuring a specific subgroup that the wireless device belongs to,
wherein the specific subgroup is either assigned by a network or is formed based on an Identity (ID) of the wireless device;
based on the wireless device not expecting a Multicast and Broadcast Service (MBS) group notification, monitoring a paging early indication (PEI);
based on receiving the PEI and the PEI indicating the specific subgroup the wireless device belongs to, monitoring a paging occasion associated with the PEI; and
based on receiving the PEI and the PEI not indicating the specific subgroup the wireless device belongs to, skipping monitoring the paging occasion associated with the PEI;
based on the wireless device expecting an MBS group notification:
ignoring the PEI; and
monitoring a paging occasion.

2. The method of claim 1, further comprising:
receiving, from the network, a PEI configuration via system information.

3. The method of claim 1, further comprising:
receiving a paging message by monitoring the paging occasion associated with the PEI,
wherein the MBS group notification is included in the paging message.

4. The method of claim 1, wherein the MBS group notification is a session identifier (ID) of a multicast session.

5. The method of claim 1, further comprising:
entering into a Radio Resource Control (RRC)_CONNECTED state from an RRC_IDLE state or an RRC_INACTIVE state, based on receiving the MBS group notification.

6. The method of claim 5, further comprising:
receiving, from the network, a multicast service based on the MBS group notification.

7. The method of claim 1, wherein the wireless device is in communication with at least one of a user equipment, a network, or an autonomous vehicle other than the wireless device.

8. A wireless device in a wireless communication system comprising:
a transceiver;
a memory; and
at least one processor operatively coupled to the transceiver and the memory, and configured to:
configure a specific subgroup that the wireless device belongs to,
wherein the specific subgroup is either assigned by a network or is formed based on an Identity (ID) of the wireless device;
based on the wireless device not expecting a Multicast and Broadcast Service (MBS) group notification, monitor a paging early indication (PEI);
based on receiving the PEI and the PEI indicating the specific subgroup the wireless device belongs to, monitor a paging occasion associated with the PEI; and
based on receiving the PEI and the PEI not indicating the specific subgroup the wireless device belongs to, skip monitoring the paging occasion associated with the PEI;
based on the wireless device expecting an MBS group notification:
ignore the received PEI; and
monitor a paging occasion.

9. The wireless device of claim 8, wherein the at least one processor is further configured to control the transceiver to receive, from the network, a PEI configuration via system information.

10. The wireless device of claim 8,
wherein the at least one processor is further configured to control the transceiver to receive a paging message by monitoring the paging occasion associated with the PEI, and
wherein the MBS group notification is included in the paging message.

11. The wireless device of claim 8, wherein the MBS group notification is a session identifier (ID) of a multicast session.

12. The wireless device of claim 8, wherein the at least one processor is further configured to enter into a Radio Resource Control (RRC)_CONNECTED state from an RRC_IDLE state or an RRC_INACTIVE state, based on receiving the MBS group notification.

13. The wireless device of claim 12, wherein the at least one processor is further configured to control the transceiver to receive, from the network, a multicast service based on the MBS group notification.

14. The wireless device of claim 8, wherein the at least one processor is further configured to be in communication with at least one of a user equipment, a network, or an autonomous vehicle other than the wireless device.

\* \* \* \* \*